Nov. 11, 1958  L. BLAGG  2,859,771
VALVE

Filed June 28, 1954  2 Sheets-Sheet 1

LEON BLAGG
INVENTOR.

BY
ATTORNEY

Nov. 11, 1958    L. BLAGG    2,859,771
VALVE

Filed June 28, 1954    2 Sheets-Sheet 2

LEON BLAGG
INVENTOR.

BY

ATTORNEY.

United States Patent Office 2,859,771
Patented Nov. 11, 1958

2,859,771
VALVE

Leon Blagg, Houston, Tex., assignor, by mesne assignments, to Jersey Production Research Company, Tulsa, Okla., a corporation of Delaware Application June 28, 1954, Serial No. 439,837

8 Claims. (Cl. 137—512.15)

The present invention is directed to a valve suitable for use in mud pumps. More particularly, the invention is directed to an improved valve having a conical seating member. In its more specific aspects, the invention has to do with a valve having high speed characteristics.

The present invention may be briefly described as a valve adapted for use in mud pumps and the like which comprises a housing provided with a plurality of spaced apart ports between spaced apart seating surfaces. A deformable cup-shaped sealing member is arranged in the housing which has at least one sealing surface on its outer surface and is provided with spaced apart rigid members imbedded in the outer surface of the seating member for correspondence with the ports to close the ports. The valve is provided with means, such as a cap screw, bearing against the sealing member and engageable with the housing for maintaining the seating member in the housing. In the valve of the present invention pressure exerted against the sealing member internally serves to maintain a seal between the sealing surface of the sealing member and the sealing surface of the housing and pressure exerted through the ports against the sealing member externally flexing the sealing member to release pressure.

The present invention will be further illustrated by reference to the drawing in which.

Figure 2:
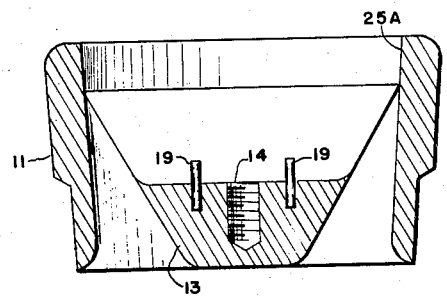
Fig. 2 is a cross section of the valve of Fig. 1 apart from the cup-shaped sealing member.
Figure 4:
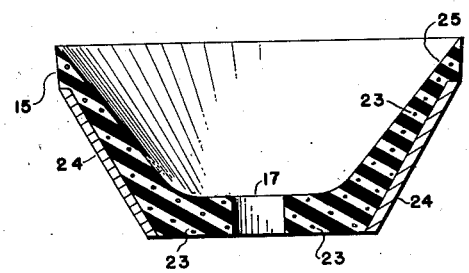
Fig. 4 is a cross-sectional view of the cup-shaped sealing member.

Referring now to the drawing in which identical numerals will be employed to designate identical parts, numeral 11 designates a metallic housing having an interior conical surface 12 having a base portion 13. The base portion 13 has a threaded opening 14. Arranged in the housing 11 is a deformable cup-shaped sealing member 15 which is adapted to receive a threaded cap screw 16 to maintain the sealing member 15 in the housing 11. The sealing member 15 may be provided with a metallic inset 17 and a metallic annular member 18 may be arranged between the threaded cap screw 16 and the metallic inset 17 to hold the sealing member 15 in the housing 11.

In Fig. 2 it will be noted that the base member 13 is provided with a plurality of upstanding pins 19 which are adapted to engage with ports 20 in the sealing member 15.

The housing 11 is provided with a plurality of spaced apart ports 21 which may be of any number but preferably of about six in number and may be reduced to about three in number and separated spaced apart seating surfaces 22.

The cup-shaped member 15 is suitably constructed of a deformable material, such as synthetic or natural rubber, and suitably may be reinforced internally with synthetic or metal fiber, such as cords or fabric or threads 23. The sealing member 15 is provided with a plurality of metallic or rigid members 24 which are imbedded in the outer surface of the seating member 15. These members are spaced apart on the outer surface of the cup-shaped member and are designed to correspond in number to the ports 21 and serve to close the ports and also to prevent extrusion of the deformable material when the valve is in the closed position. The cup-shaped member 15 of Figs. 1 to 5 is provided with a sealing surface 25 which is in the form of an annular lip on the upper periphery of the sealing member 15 and is adapted to seal with the surface 25A of the housing 11 and also with the seating surfaces 22.

Figure 6:
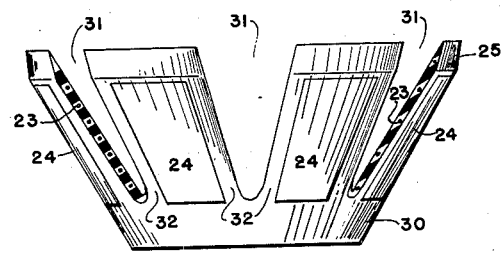
Fig. 6 is a modification of the cup-shaped member of Fig. 4.
Figure 1:
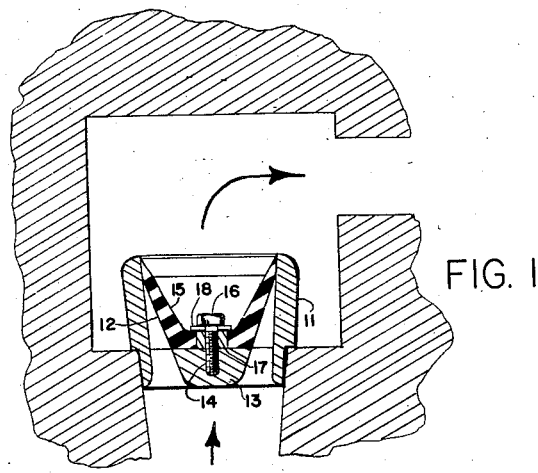
Fig. 1 is a cross-sectional view of the assembled valve in accordance with the present invention.
Figure 3:
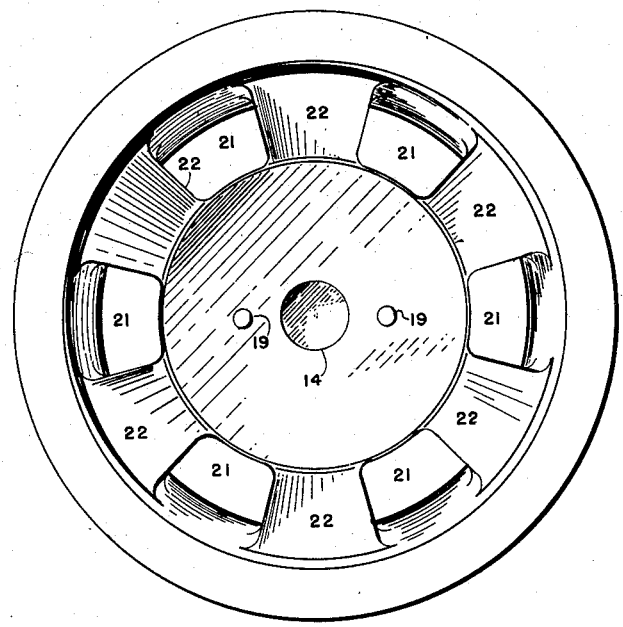
Fig. 3 is a top view of the valve of Fig. 2.
Figure 5:
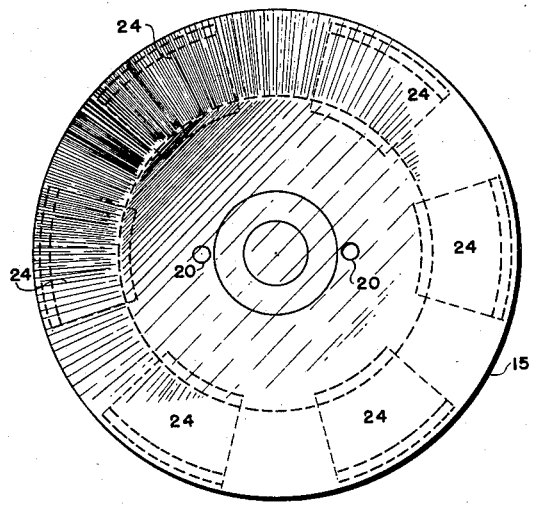
Fig. 5 is a top view of the sealing member of Fig. 4.

Referring now to Fig. 6, which is somewhat similar to the other figures of the drawing, a modified cup-shaped member 30 is provided which has imbedded in it a plurality of rigid metallic members 24. The cup-shaped member 30 may also be suitably reinforced and has a plurality of V-slots 31 cut out of the cup-shaped member 30. These V-slots 31 impart flexibility to the cup-shaped sealing member 30 and also provide sealing surfaces 32 around the imbedded rigid members 24. The pins 19 are designed to be inserted in the ports 20 to align the metallic members 24 with the ports 21 to prevent extrusion of the rubber as has been stated.

The valve of the present invention is suitable for use in mud pumps and where abrasive fluids are being pumped, such as slurries, suspensions, and the like. It is also suitable for use as a check valve in many services.

The apparatus of the present invention works in the following manner: Pressure is exerted against the exterior surface of the cup-shaped members 15 or 30 through the ports 21 which causes deformation of the deformable member to allow, in the case of Figs. 1 to 5, the lip or sealing surface 25 to be moved away from the inside wall or the surface 25A of the valve housing 11 allowing pressure to be released. Pressure exerted internally on the cup-shaped member causes the sealing surface 25 to flatten against the interior wall or the surface 25A of the housing 11 and in the case of Fig. 6 the surfaces 32 as well as the surface 25 seal against the sealing surfaces 25A and 22 of the housing 11.

As stated, the deformable member may be constructed of synthetic or natural rubber. Natural rubber may be used where the fluid coming into contact with the deformable member is free from hydrocarbons which attack the deformable member. There are many synthetic rubbers on the market which will serve this purpose.

The internal reinforcement for the deformable member may be a synthetic or natural fiber, such as nylon, rayon, Dacron, and the like, while the natural fibers may include, cotton, silk, ramie, flax, and others needless to mention here. Metallic fibers may also be used as well as mineral fibers such as asbestos.

The present invention is quite useful and has been used successfully in a mud pump pumping fluids for about 4 million cycles of operation.

The principal advantage of the present invention over the prior art is that the valve seating member works rapidly under high speed. Thus it is provided with flexibility and has a cup-shaped sealing member which fits inside a correspondingly shaped metallic seat which has suitable fluid passages through the seat. In the operation of the valve a pressure difference in one direction deflects the cup and allows flow through the valve while a pressure difference in the other direction deflects the cup against the seat and prevents flow.

The invention has many advantages in that streamline flow of fluid through the valve is obtained. The cup-shaped sealing member is deflected instead of stretched and, if there is any stretch or growth of the sealing member, this will not be detrimental to the seal because of the internal location of the sealing member.

The invention embodying the improved valve may have a longer life than the conventional valve because there is less hammer and resulting shock loads than in conventional valves. Furthermore, the valve has high speed characteristics resulting from the small opening movement of the valve by deflection of the sealing surface.

The present invention has been used under low and high pressures successfully. With increasing pressure a larger number of ports, such as six, is to be preferred while with low pressures a smaller number of the larger ports may be used. It is preferred, however, to use approximately six ports with a corresponding number of metallic insets imbedded in the valve seating member.

The nature and objects of the present invention having been completely described and illustrated, what I wish to claim as new and useful and to secure by Letters Patent is:

1. A valve adapted for use in mud pumps and the like comprising a housing having a conically configured interior surface being formed to provide a plurality of spaced apart ports, an internally reinforced deformable cup-shaped sealing member arranged on said interior surface and being provided with a sealing lip surface on its outermost periphery adapted to engage with and disengage from said housing, spaced apart rigid means inset in the outer surface of said sealing member adapted to close said ports and releasable means connecting said sealing member to said housing adapted to maintain said sealing member in said housing, said lip surface being short relative to the remaining portion of said sealing member and flexing to disengage from said housing to permit fluid flow through said housing when fluid pressure is directed toward the exterior of said sealing member and sealingly engaging with said housing to prevent fluid flow through said housing when fluid pressure is directed toward the interior of said sealing member.

2. Apparatus as recited in claim 1 wherein means is provided on said housing and said sealing member cooperating to align said rigid means and said ports.

3. Apparatus as recited in claim 2 wherein said internal reinforcement for said cup-shaped sealing member comprises natural fibers.

4. Apparatus as recited in claim 2 wherein said internal reinforcement comprises synthetic fibers.

5. A valve adapted for use in mud pumps and the like comprising a housing having a conically configured interior surface being formed to provide a plurality of spaced apart ports, an internally reinforced deformable cup-shaped sealing member being formed to provide spaced apart openings and arranged on said interior surface, said sealing member being provided with sealing surfaces surrounding each of said ports, said sealing surfaces including a plurality of spaced apart sealing lip surfaces on the outermost periphery of said sealing member between said spaced apart openings adapted to engage with and disengage from said housing, and releasable means connecting said sealing member to said housing adapted to maintain said sealing member in said housing, said lip surfaces being short relative to the remaining portion of said sealing member and flexing to disengage from said housing to permit fluid flow through said housing when fluid pressure is directed toward the exterior of said sealing member and sealingly engaging with said housing to prevent fluid flow through said housing when fluid pressure is directed toward the interior of said sealing member and spaced apart rigid means inset in the outer surface of said sealing member enclosed by said sealing surfaces adapted to cover said ports.

6. Apparatus as recited in claim 5 wherein means is provided on said housing and said sealing member cooperating to align said rigid means and said ports.

7. Apparatus as recited in claim 6 wherein said internal reinforcement comprises natural fiber.

8. Apparatus as recited in claim 6 wherein said internal reinforcement comprises synthetic fiber.

References Cited in the file of this patent

UNITED STATES PATENTS

| | | |
|---|---|---|
| 1,438,161 | Zimmerman | Dec. 5, 1922 |
| 1,800,157 | Saunders | Apr. 7, 1931 |
| 1,956,691 | McCune | May 1, 1934 |
| 2,008,818 | Corbett | July 23, 1935 |

FOREIGN PATENTS

| | | |
|---|---|---|
| 738,391 | Germany | of 1943 |